US006953768B2

(12) United States Patent
Wallace et al.

(10) Patent No.: US 6,953,768 B2
(45) Date of Patent: Oct. 11, 2005

(54) MULTI-COMPONENT CATALYST SYSTEM FOR THE POLYCONDENSATION MANUFACTURE OF POLYESTERS

(75) Inventors: Andrew Wallace, Huntingdon (GB); Philip James Martin, Baldock (GB); Alan David Farnaby, Royston (GB)

(73) Assignee: Teck Cominco Metals Ltd. (CA)

( * ) Notice: Subject to any disclaimer, the term of this patent is extended or adjusted under 35 U.S.C. 154(b) by 222 days.

(21) Appl. No.: 10/303,977

(22) Filed: Nov. 26, 2002

(65) Prior Publication Data

US 2004/0102316 A1 May 27, 2004

(51) Int. Cl.$^7$ .......................... B01J 23/00; B01J 21/00; B01J 23/32; B01J 23/02; B01J 23/04
(52) U.S. Cl. ................. 502/242; 502/308; 502/321; 502/322; 502/349; 502/355; 502/324; 502/344; 423/618
(58) Field of Search ..................... 502/242, 308, 502/321, 322, 349, 355, 324, 344; 423/618

(56) References Cited

U.S. PATENT DOCUMENTS

| | | | |
|---|---|---|---|
| 3,651,017 A | | 3/1972 | Tanabe et al. |
| 3,878,131 A | * | 4/1975 | Hayes ........................ 502/330 |
| 3,882,047 A | * | 5/1975 | Niina et al. ................. 502/211 |
| 4,082,698 A | * | 4/1978 | Shaw et al. ................. 502/308 |
| 4,238,359 A | * | 12/1980 | Akiyama et al. ........... 502/209 |
| 4,361,694 A | | 11/1982 | Weinberg et al. ........... 528/279 |
| 4,378,309 A | * | 3/1983 | Shaw et al. ................. 502/308 |
| 4,433,135 A | | 2/1984 | Worley et al. .............. 528/282 |
| 4,507,401 A | * | 3/1985 | Dubois et al. .............. 502/242 |
| 4,565,845 A | | 1/1986 | Inoue et al. |
| 4,888,167 A | * | 12/1989 | Flanigen et al. ............ 423/306 |
| 4,912,081 A | * | 3/1990 | Sofranko et al. ........... 502/207 |
| 5,134,105 A | * | 7/1992 | Paparizos et al. .......... 502/205 |
| 5,254,519 A | * | 10/1993 | Wan et al. .................. 502/252 |
| 5,314,987 A | * | 5/1994 | Kim et al. .................. 528/289 |
| 5,350,829 A | | 9/1994 | Kawamoto |
| 5,385,773 A | | 1/1995 | Yau et al. |
| 5,417,908 A | | 5/1995 | Enggasser et al. |
| 5,644,019 A | | 7/1997 | Po' et al. .................... 528/272 |
| 5,859,165 A | * | 1/1999 | Bossert et al. ................ 528/58 |
| 6,156,867 A | | 12/2000 | Aoyama et al. ............ 528/282 |
| 6,258,925 B1 | | 7/2001 | Dowling et al. ............ 528/279 |
| 6,358,578 B1 | | 3/2002 | Otto et al. .................. 428/35.7 |
| 6,365,659 B1 | | 4/2002 | Aoyama et al. ............ 524/399 |
| 6,372,879 B1 | | 4/2002 | Dowling et al. ............ 528/279 |
| 6,417,320 B1 | | 7/2002 | Otto et al. .................. 528/279 |
| 6,559,085 B1 | * | 5/2003 | Sasaki et al. ................. 502/22 |
| 6,616,910 B2 | * | 9/2003 | Rouleau et al. ............. 423/706 |
| 6,642,405 B1 | * | 11/2003 | Mori et al. ................. 558/338 |
| 6,656,873 B2 | * | 12/2003 | Chaturvedi et al. ......... 502/312 |
| 6,777,571 B2 | * | 8/2004 | Chaturvedi et al. ......... 558/323 |
| 6,828,272 B2 | | 12/2004 | Wiegner et al. |
| 2003/0045673 A1 | | 3/2003 | Nakajima et al. ........... 528/282 |
| 2003/0083191 A1 | | 5/2003 | Nakajima et al. |
| 2004/0058805 A1 | | 3/2004 | Nakajima et al. |

FOREIGN PATENT DOCUMENTS

| | | | |
|---|---|---|---|
| EP | 0 745 629 A2 | 12/1996 | |
| EP | 1 153 953 A1 | 11/2001 | ........... C08G/63/82 |
| EP | 1 227 117 A1 | 7/2002 | ........... C08G/63/82 |
| JP | 55149320 | 11/1980 | |
| JP | 06116374 | 4/1994 | |
| JP | 10259246 | 9/1998 | |
| JP | 2000154242 | 6/2000 | |
| JP | 2001226474 | 8/2001 | |
| WO | WO 93/22367 | 11/1993 | ........... C08G/63/86 |
| WO | WO 99/28033 | 6/1999 | ............ B01J/31/12 |
| WO | WO 00/71252 | 11/2000 | ............ B01J/31/12 |
| WO | WO 01/14448 | 3/2001 | ........... C08G/63/82 |
| WO | WO 01/56694 | 8/2001 | ............ B01J/31/04 |
| WO | WO 02/42537 A2 | 5/2002 | |
| WO | 02/42537 | 5/2002 | |
| WO | WO-2004/014982 A2 | 2/2004 | |

OTHER PUBLICATIONS

Abstract—WO 01/14448 A1, published Mar. 1, 2001, Nakajima et al.

Abstract—WO 02/072665 A1, published Sep. 19, 2002, Tukamoto et al.

Abstract—WO 02/22707 A1, published Mar. 21, 2002, Nakajima et al.

Abstract—WO 02/057335 A1, published Jul. 25, 2002, Nakajima et al.

Abstract—WO 02/068500 A1, published Sep. 6, 2002, Nakajima et al.

Abstract—JP 2001026639 A, Jan. 30, 2001, Toyobo KK (TOYM), Derwent WPI.

Abstract—JP 2002249567 A, Sep. 6, 2002, Toyobo KK (TOYM), Derwent WPI.

Abstract—JP 2002249569 A, Sep. 6, 2002, Toyobo KK (TOYM), Derwent WPI.

Abstract—JP 2002249572 A, Sep. 6, 2002, Toyobo KK (TOYM), Derwent WPI.

Abstract—JP 2002302854 A, Oct. 31, 2000, Toyobo KK (TOYM), Derwent WPI.

(Continued)

Primary Examiner—Cam N. Nguyen
(74) Attorney, Agent, or Firm—Synnestvedt Lechner & Woodbridge LLP

(57) ABSTRACT

This invention relates to new multi-component catalyst systems for the polycondensation of polyesters. More particularly, this invention pertains to novel multi-component, germanium based catalyst systems for the polycondensation of PET (polyethylene terephthalate) used in the manufacture of bottles, fiber or film. A multi-component catalyst system for the polycondensation of a polyester comprising the element germanium and one or more catalyst enhancers selected from the group of elements consisting of aluminium, silicon, molybdenum, manganese, lithium and combinations thereof, said elements being in the form of compounds, salts, compositions, oxides or organic complexes.

39 Claims, No Drawings

OTHER PUBLICATIONS

Abstract—JP 2002155134 A, May 28, 2002, Toyobo KK (TOYM), Derwent WPI.
Abstract—JP 2002220453 A, Aug. 9, 2002, Toyobo KK (TOYM), Derwent WPI.
Abstract—JP 2001213952 A, Aug. 7, 2001, Toray Ind. Inc. (TORA), Derwent WPI.
Delphion Database, Abstract of JP 2001019753A2: Production of Polyester, Middlemas et al., Jan. 23, 2001.
2002:408863 Caplus, Abstract WO 2002042537A2: Esterification catalyst, polyesterification process, and polyester article, Bellamy et al.
2000:356239 Caplus, Abstract JP 2000143790A2: Manufacture of polyesters by using germanium catalysts, Hori et al.
1973:98459 Caplus, Abstract JP 47035794 B4: Polyester polycondensation catalysts containing germanium compounds, Tsunawaki et al.
1972:552889 Caplus, Abstract DE 2202476: Catalysts for manufacturing polyesters, Brooks et al.

Dialog(R)File 351:Derwent WPI, Thomson Derwent, Abstract FR 2173075: Polyesters by ester exchange—using zinc-germanium synergistic catalyst, Eastman Kodak Co.

PET "White Book: A useful reference document for the PET user industry", produced by the APME, Dec. 1998, Constar Europe Marketing.

Tremblay, Aspen Technology Inc., 1999, "Using Simulation Technology to Improve Profitability in the Polymer Industry", AIChE Annual Meeting, Houston Texas, Mar. 14–19, 1999.

* cited by examiner

MULTI-COMPONENT CATALYST SYSTEM FOR THE POLYCONDENSATION MANUFACTURE OF POLYESTERS

TECHNICAL FIELD

This invention relates to new multi-component catalyst systems for the polycondensation of polyesters. In a particular aspect, this invention pertains to novel multi-component germanium based catalyst systems for the polycondensation of PET (polyethylene terephthalate) used in the manufacture of bottles, fibre and film.

BACKGROUND OF THE INVENTION

It is well known in the polycondensation catalyst field that there are three primary polycondensation catalysts, based on the metals titanium, antimony and germanium. Titanium (Ti) displays the highest activity but it has the disadvantage that it generates a large range of undesirable side reactions which produce a polymer with a problematic yellow discoloration. For instance, in the case of polyethylene terephthalate polymers, once the polymer is formed, it is very difficult to colour correct.

An antimony (Sb) based catalyst, such as antimony trioxide, is the most commercially used type of catalyst. However, it too requires color correction. This is believed to be due to the fact that particulate antimony remains in the polymer thereby resulting in a grey discoloration in the polymer. There is a growing health concern issue that relates to the use of antimony in manufacturing polymers that will contact food. Such food may thereby absorb antimony. Additionally there are significant environmental concerns regarding the disposal of an antimony-containing distillate which is an inevitable by-product of the polycondensation reaction. Finally, there are considerable environmental issues relating to up-stream processing of antimony catalysts.

Germanium (Ge), from a chemical and polymer discoloration viewpoint, has no negative implications as a polycondensation catalyst. However, germanium is costly and its cost is prohibitive to all but the highest quality polymer producers. Significant research has been invested in the discovery of catalyst formulations which combine the benefits of the three catalyst elements described above whilst at the same time eliminating undesirable characteristics. In the case of germanium, this essentially has led to the incorporation of additional active elements or compounds which maintain catalytic reactivity but reduce cost without adversely affecting the polymer quality. In much of the prior art, germanium has traditionally been used as a component to increase the quality of polymer produced by catalysts such as titanium or antimony.

Prior literature discloses many ways of adding germanium to a polycondensation reaction. For example Japanese patent JP 2001019753A2 published Jan. 23, 2001, assigned to Meldform Metals, details the complexing of germanium dioxide with a range of carboxylic acids, to produce an aqueous solution containing germanium dioxide in a concentration of 10 to 20 wt. %.

Other patents have disclosed the use of synergistic catalyst enhancers, containing carboxylic acids, in combination with titanium-containing catalysts. For instance, U.S. Pat. No. 6,372,879 B1, granted Apr. 16, 2002, assigned to ATOFINA Chemicals Inc., describes a range of synergistic combinations with a titanium-containing catalyst and lithium, sodium, potassium, rubidium, cesium, beryllium, magnesium, calcium, strontium, barium and ammonium salts.

U.S. Pat. No. 6,258,925 B1, granted Jul. 10, 2001, assigned to ATOFINA, discloses a titanyl oxalate catalyst and a catalyst enhancer such as a metallic oxalate, for example, lithium oxalate.

WO 00/71252 A1, published Nov. 30, 2000, assigned to ACMA Limited, discloses a catalyst composition for use in the preparation of esters, comprising an organometallic compound which is a reaction product of an orthoester or condensed orthoester of titanium, zirconium or aluminium, used in combination with a compound of germanium, antimony or tin. In this case, the preferred orthoester has the formula $M(OR)_4$ or $Al(OR)_3$ where M is titanium or zirconium and R is an alkyl group, and the condensed orthoester typically being of the formula $R_1O[M(OR_1)_2O]nR_1$. These organometallic compounds are prepared by reacting the orthoester and the metallic compound in the presence of, preferably, a dihydric alcohol such as 1,2-ethanediol.

U.S. Pat. No. 6,365,659 B1, granted Apr. 2, 2002, assigned to Toray Industries Inc., discloses a polyester composition comprising a polyester and a compound oxide of titanium as an essential element and a metal element selected from the group consisting of aluminium, zirconium germanium, tin and silicon. Specific particle size distribution for these catalysts in the polyester is stated.

WO 0156694 A1, published Aug. 9, 2001, assigned to ACMA Limited, discloses the combination of an organometallic compound containing either titanium or zirconium with a second metal from the group consisting of germanium, tin and antimony and a carboxylic acid. In the preferred embodiment a hydroxy alcohol and a base are also present.

WO 9322367 A1/EP0591488A1, assigned to Rhone Poulenc Viscosuisse SA, refers to a dual polycondensation catalyst system comprising lithium and germanium. The invention concerns a method of producing, without using antimony, a polyester from poly(ethylene terephthalate) units. Following esterification, a mixed catalyst consisting of 10 to 75 parts per million of lithium and 15 to 80 parts per million of germanium is used for polycondensation. The antimony-free polyester thus obtained is purportedly suitable for use in the manufacture of bottles, sheeting, film, fibre, filaments and molded articles.

U.S. Pat. No. 5,417,908, assigned to Rhone Poulenc Viscosuisse SA, granted May 23, 1995, describes a polyester manufactured using manganese as an esterification catalyst, de-activating the manganese with phosphoric acid and subsequently adding germanium as the primary polycondensation to form a polyethylene terephthalate polyester.

WO 99/28033, assigned to Tioxide Specialities Limited, discloses the use of an organometallic catalyst which is a reaction product of an orthoester or condensed orthoester of titanium, zirconium or aluminium, an alcohol with at least two hydroxyl groups, an organophosphorous compound and a base.

U.S. Pat. No. 6,358,578 B1, assigned to Zimmer AG, granted Mar. 19, 2002, describes a product which uses high surface area activated charcoal to promote the activity of a polycondensation catalyst such as antimony, titanium, lead, germanium, zinc and tin.

SUMMARY OF THE INVENTION

The catalyst systems according to the invention are new types of polycondensation catalysts and have particular application to the polycondensation reaction of the monomer bis-hydroxy-ethyl terephthalate (BHET) at elevated temperature and reduced pressure to produce high quality polyethylene terephthalate (PET). The catalyst systems described herein are comprised of a core germanium catalyst and one or more specified enhancers.

A multi-component catalyst system for the polycondensation of a polyester comprising the element germanium and one or more catalyst enhancers selected from the group of elements consisting of one or more of aluminium, silicon, molybdenum, manganese, lithium and combinations thereof, excepting the combination of germanium and lithium only, said elements being in the form of compounds, salts, compositions, oxides or organic complexes. The monomer may be bis-hydroxy-ethyl terephthalate, which can be polycondensed to produce polyethylene terephthalate.

When the catalyst system comprises germanium and aluminium, the level of germanium in the polyethylene terephthalate can be in the range from 1 part per million to 200 parts per million and the level of aluminium in the polyethylene terephthalate can be in the range from 1 part per million to 400 parts per million. More specifically, the level of germanium can be 5 to 100 parts per million and the level of aluminium can be 20 to 200 parts per million. Preferably, the level of germanium can be 20 to 60 parts per million and the level of aluminium can be 60 to 150 parts per million.

When the catalyst system comprises germanium and silicon, the level of germanium in the polyethylene terephthalate can be in the range from 1 part per million to 200 parts per million and the level of silicon in the polyethylene terephthalate can be in the range from 1 part per million to 400 parts per million. More specifically, the level of germanium can be 10 to 80 parts per million and the level of silicon can be 10 to 200 parts per million. Preferably, the level of germanium can be 20 to 60 parts per million and the level of silicon can be 20 to 150 parts per million.

When the catalyst system is germanium and molybdenum, the level of germanium in the polyethylene terephthalate can be 1 to 200 parts per million and the level of molybdenum in the polyethylene terephthalate can be 1 to 200 parts per million. More specifically, the level of germanium can be 1 to 100 parts per million and the level of molybdenum can be 1 to 100 parts per million. Preferably, the level of germanium can be 5 to 60 parts per million and the level of molybdenum can be 1 to 60 parts per million.

When the catalyst system comprises germanium and manganese, the level of germanium in the polyethylene terephthalate can be 1 to 200 parts per million and the level of manganese in the polyethylene terephthalate can be 1 to 400 parts per million. More specifically, the level of germanium can be 10 to 80 parts per million and the level of manganese can be 10 to 200 parts per million. Preferably, the level of germanium can be 20 to 60 parts per million and the level of manganese can be 20 to 150 parts per million.

When the catalyst system is germanium and lithium, and one or more of aluminium, silicon, molybdenum and manganese, the level of germanium in the polyethylene terephthalate can be 1 to 200 parts per million and the level of lithium in the polyethylene terephthalate can be 1 to 200 parts per million. More specifically, the level of germanium can be 20 to 60 parts per million and the level of lithium can be 10 to 80 parts per million. Preferably, the level of germanium can be 20 to 60 parts per million and the level of lithium can be 20 to 40 parts per million.

When the catalyst systems comprise germanium, aluminium and silicon, or germanium, aluminium and molybdenum, or germanium, aluminium and manganese, or germanium, aluminium and lithium, or germanium, silicon and molybdenum, or germanium, silicon and manganese, or germanium, silicon and lithium, or germanium, molybdenum and manganese, or germanium, molybdenum, and lithium, or germanium, manganese and lithium, the level of germanium in the polyethylene terephthalate can be in the range from 1 part per million to 200 parts per million, the level of aluminium in the polyethylene terephthalate can be in the range from 1 part per million to 200 parts per million, the level of silicon can be 1 part per million to 200 parts per million, the level of molybdenum can be 1 part per million to 200 parts per million, the level of manganese can be 1 part per million to 200 parts per million, and the level of lithium can be 1 part per million to 200 parts per million.

The catalyst system can also comprise germanium, aluminium, silicon and molybdenum, or germanium, aluminium, silicon and manganese, or germanium, aluminium, silicon and lithium or germanium, silicon, molybdenum and manganese, or germanium, silicon, molybdenum and lithium, or germanium, molybdenum, manganese and lithium, or germanium, aluminium, molybdenum and manganese, or germanium, aluminium, manganese and lithium, or germanium, silicon, molybdenum and manganese, or germanium, aluminium, molybdenum and lithium, or germanium, silicon, manganese and lithium, or germanium, aluminium, silicon, manganese and molybdenum, or germanium, aluminium, silicon, manganese and lithium, or germanium, silicon, manganese, molybdenum and lithium, or germanium, aluminium, silicon, molybdenum and lithium, the level of germanium in the polyethylene terephthalate can be in the range from 1 part per million to 200 parts per million, the level of aluminium can be in the range from 1 part per million to 200 parts per million, the level of silicon in the polyethylene terephthalate can be in the range from 1 part per million to 200 parts per million, the level of molybdenum in the polyethylene terephthalate can be in the range from 1 part per million to 200 parts per million and the level of manganese in the polyethylene terephthalate can be in the range from 1 part per million to 200 parts per million, and the level of lithium in the in the polyethylene terephthalate can be in the range from 1 part per million to 200 parts per million.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

We have discovered that a range of specific elements, which independently show limited catalytic activity, can significantly enhance the activity of germanium as a polycondensation catalyst. A synergistic relationship has been discovered between these catalyst enhancers and germanium-based catalysts. We have found that aluminium, silicon, molybdenum or manganese used either independently with germanium or in a mixed combination (which can include lithium) exhibits a high catalyst activity when compared to a PET polycondensation product catalysed by germanium only, or the activity of the co-catalyst only, or the sum of their independent activities. This synergistic effect enables a polycondensation polymer of high quality to be produced without entailing the costs normally associated with a germanium only-catalysed polymer.

It should be understood that in the discussion herein, and in the claims, when we refer to the elements germanium, aluminium, silicon, molybdenum, manganese and lithium, we are referring to the use of those elements in any conceivable polycondensation catalyst system, including but not limited to the salts of these elements, compositions containing these elements, compounds incorporating these elements, oxides or organic complexes of germanium and the catalyst enhancers aluminium, silicon, molybdenum, manganese and lithium.

The use of our catalyst enhancers reduces the germanium requirement and thereby reduces catalyst cost thereby enabling the benefits of germanium-catalysed PET to be gained in markets which otherwise would be excluded on a cost basis. We have found that it is possible according to the invention to maintain optimum catalyst quality. It is also possible after adjustment of the ratios of the respective elements to produce an antimony-free alternative catalyst system at a competitive cost.

Examples of catalyst combinations that demonstrate the subject invention are given in Table 1. However, it should be understood that those examples do not represent the full range of catalyst levels which have displayed the synergistic effect and accordingly the scope of the invention is not limited thereby. It should also be understood that the combinations which demonstrate the highest levels of catalytic activity do not necessarily produce PET with the most preferred characteristics. For the purposes of these tests germanium content in the polyester has been most preferably used in the range from 5 to 60 parts per million. However, beneficial effects have been observed in the range from 1 to 200 parts per million germanium.

For aluminium in combination with a germanium, co-catalyst synergy has been observed in the range from 1 to 400 parts per million. However, the preferable range of aluminium is 20 to 200 parts per million and ideally 60 to 150 parts per million, dependant upon the levels of the co-catalyst employed.

For silicon in combination with a germanium, co-catalyst synergy has been observed in the range from 1 to 400 parts per million. However, the preferable range of silicon is 20 to 200 parts per million and ideally 60 to 150 parts per million, dependant upon the levels of the co-catalyst employed.

Molybdenum has been investigated in combination with germanium in the range from 1 to 200 parts per million levels with significant catalytic activity being observed at low levels, specifically with the level of molybdenum being in the range or 1 to 100 parts per million and the most preferred range being 1 to 60 parts per million molybdenum.

Manganese has displayed germanium co-catalyst properties in the range from 1 to 400 parts per million, more specifically 10 to 200 parts per million, and the most preferred being in the range from 20 to 60 parts per million.

Lithium in combination with one or more of aluminium, silicon, molybdenum and manganese has demonstrated germanium co-catalytic activity in the range from 1 to 200 parts per million, the most preferred levels being 10 to 80 parts per million and ideally 20 to 40 parts per million.

It should be understood that these optimized catalyst loadings are dependent upon the germanium level, and, particularly with respect to catalyst systems including two or more co-catalysts, the other components within the system.

A primary advantage of the germanium co-catalysts we have discovered is that it is possible to obtain high quality polymer manufactured using reduced germanium levels. Therefore, a significant benefit of our co-catalyst system according to the invention is reduced cost and the opportunity for replacement of heavy metal catalysts in lower value applications. Without being adversely bound by any theories, but in the interests of explaining the invention, we believe that novelty in the invention resides in the synergistic effects on the catalytic activity that we have observed when combining the previously mentioned catalyst enhancers with germanium. We have described the elements as catalyst enhancers rather than catalysts due to their relatively limited activity when used independently, compared with the remarkable activity that we have discovered when they are used in combination with germanium. The enhancer elements we have discovered have not been demonstrated within the prior art and have negligible independent catalytic activity, but surprisingly display significant levels of activity when combined with germanium.

Advantages of the co-catalyst systems we have discovered are fast reaction rate, lower cost, lower catalyst (metal) addition, and comparable polymer quality to commercial PET products using commercially available catalysts.

EXAMPLE

Catalyst testing was carried using a conical 5-L stainless steel oil-jacketed reaction vessel. The experiments were carried out at a controlled melt temperature of 280° C. and at pressures of typically less than 1 mbar. The reaction melt was agitated by a vertically mounted helical stirrer operating at a constant speed (100 rpm). The stirrer motor's amperage was monitored. The reaction is considered to be complete when an amperage generating a torque equivalent to an intrinsic viscosity of 0.6 is attained. (Intrinsic Viscosity (IV), is an indication of polymer chain length and thus degree of polymerisation.) Distillates generated by both the pre-polycondensation and the polycondensation steps were collected separately. Catalyst-free BHET (bis-hydroxy-ethyl terephthalate) was typically used eliminating the need for the suppression of esterification catalysts. Catalysts and stabilisers were added to the vessel at the time of BHET charging and air was removed from the system prior to the reaction commencing. Information relating to the oil and reaction temperatures, the pressure within the vessel, the stirrer speed and torque was automatically logged every 10 seconds to enable accurate batch to batch correlation to be attained. For comparison calibration purposes, test batches containing commercially available germanium-containing catalysts were periodically completed. These experiments provided a catalyst activity template against which different catalyst systems could be easily compared. Typical reaction times for germanium-catalysed polycondensation over a range of catalyst loadings are described in Table 1 below. Table 1 below also tabulates results obtained from conducting polycondensation tests using various metals, alone or in combination.

TABLE 1

| Test Number for Patent | Catalyst Type | Catalyst Loading ppm | Polycon Time mins | IV LSP |
|---|---|---|---|---|
| Ge Template 3 | | | | |
| A1 | Ge Only | 100 | 84.9 | 0.607 |
| A2 | Ge Only | 100 | 85.1 | 0.612 |
| A3 | Ge Only | 80 | 93.6 | 0.608 |
| A4 | Ge Only | 80 | 92.0 | 0.635 |

TABLE 1-continued

| Test Number for Patent | Catalyst Type | Catalyst Loading ppm | Polycon Time mins | IV LSP |
|---|---|---|---|---|
| A5 | Ge Only | 60 | 105.5 | 0.608 |
| A6 | Ge Only | 60 | 104.3 | 0.624 |
| A7 | Sb Only | 200 | 108.2 | 0.603 |
| A8 | Li Only | 200 | Abandoned | |
| A9 | Li Only | 80 | Abandoned | |
| A10 | Al Only | 120 | Abandoned | |
| A11 | Ge/Al | 60/60 | 68.5 | 0.613 |
| A12 | Ge/Al | 60/30 | 83.5 | 0.616 |
| A13 | Ge/Al | 60/25 | 96.5 | 0.603 |
| A14 | Ge/Al | 50/43 | 90.0 | 0.618 |
| A15 | Ge/Al | 45/45 | 103.0 | 0.623 |
| A16 | Ge/Al | 40/53 | 83.5 | 0.624 |
| A17 | Ge/Al | 30/60 | 88.5 | 0.615 |
| A18 | Ge/Al | 20/80 | 93.6 | 0.600 |
| A19 | Ge/Al | 10/200 | 133.7 | 0.586 |
| A20 | Ge/Al | 60/150 | 59.0 | 0.608 |
| A21 | Mo Only | 200 | 111.6 | 0.578 |
| A22 | Mo Only | 60 | 118.1 | 0.575 |
| A23 | Ge/Mo | 60/60 | 26.7 | 0.560 |
| A24 | Ge/Mo | 60/20 | 30.8 | 0.574 |
| A25 | Ge/Mo | 60/5 | 35.8 | 0.581 |
| A26 | Ge/Mo | 30/5 | 54.3 | 0.578 |
| A27 | Ge/Mo | 30/5 | 55.3 | 0.573 |
| A28 | Ge/Mo | 5/60 | 63.3 | 0.560 |
| A29 | Ge/Al/Si | 45/45/15 | 87.5 | 0.611 |
| A30 | Ge/Al/Li | 45/45/45 | 83.6 | 0.605 |
| Ge Template 2 | | | | |
| B1 | Ge Only | 80 | 100.5 | 0.594 |
| B2 | Ge Only | 60 | 115.7 | 0.610 |
| B3 | Ge Only | 60 | 116.7 | 0.602 |
| B4 | Ge Only | 40 | 132.0 | 0.618 |
| B5 | Si Only | 200 | Abandoned | |
| B6 | Ge/Si | 60/155 | 83.5 | 0.591 |
| B7 | Ge/Si | 60/20 | 99.5 | 0.580 |
| B8 | Ge/Si | 40/103 | 107.2 | 0.592 |
| B9 | Ge/Si | 40/34 | 123.0 | 0.608 |
| B10 | Mn Only | 200 | 136.0 | 0.598 |
| B11 | Ge/Mn | 50/21 | 117.0 | 0.606 |

T105: Al only; 120 ppm Al as tartrate; zero activity
T92: Li only; 80 ppm as oxalate; zero activity The term "abandoned" in tests A8, A9, A10 and B5 means that the tests were stopped after there was no increase in torque after two hours at the standard polycondensation temperature and pressure.

Test Criteria and Results of Testing

All BHET used was free from esterification catalysts in order to eliminate any potential interaction with the polycondensation catalysts tested.

Phosphorus was added as a thermal stabiliser and in some processes it was also added to deactivate esterification catalysts prior to beginning polycondensation. It is known that phosphorus can affect the activity of polycondensation catalysts and therefore all tests were performed with a reasonable level (40 parts per million) of phosphorus added as $H_3PO_4$.

Control samples containing germanium only were tested to produce a template. All new catalysts were tested against a germanium-only template of 40 to 100 parts per million addition. Care was taken to produce a new template following any maintenance work on the PET reactor that might affect the process control characteristics. The examples described show tests performed versus two templates (A and B) which were produced following a change of temperature control equipment.

Referring to Table 1, samples A1–A6 were tested at 60, 80 and 100 parts per million germanium addition. The reproducibility of tests was shown to be very good. Also, a standard commercially available antimony catalyst (A7) was tested in order to compare activity and total catalyst loading. Aluminium, lithium and molybdenum were tested against this template. Each element was tested on its own and in combination with germanium at various levels.

Samples B1–B4 were tested at 40, 60 and 80 parts per million germanium addition. The reproducibility of tests was shown to be very good. Silicon and manganese were tested against this template. Each element was tested on its own and in combination with germanium at various levels.

During any test campaign, germanium-only tests were performed at regular intervals to ensure no drift from the template.

Lithium—Samples A8–A9

Lithium showed no catalytic activity on its own even at 200 parts per million addition. When combined with germanium, however, the germanium activity was enhanced. It appears that the enhanced activity is limited, with approximately the same activity achieved with the lithium addition varied between 10 and 80 parts per million.

Aluminium—Samples A10–A20

Aluminium showed no catalytic activity on its own. However, when combined with germanium, aluminium enhanced the catalytic activity of the germanium. Various germanium/aluminium levels are shown, each of which shows significantly enhanced activity compared with the same level of germanium on its own. In fact, even at 20 parts per million germanium addition (A18), an equivalent activity to germanium only at 80 parts per million addition is achieved. At this level, the activity is greater than a standard antimony catalyst addition of 200 parts per million (A7), and the catalyst contains only 50% of the metallic addition levels as the antimony catalyst, and is much less expensive than the equivalent germanium-only catalyst.

Molybdenum—Samples A21–A28

Molybdenum showed some catalytic activity on its own. However, when combined with germanium, molybdenum enhanced the catalytic activity of the germanium by a much greater amount than would be expected based on the molybdenum activity on its own. Various germanium/molybdenum levels are shown, each of which shows significantly enhanced activity compared with the same level of germanium on its own. In fact, even at 5 parts per million germanium addition (A28), an equivalent activity to germanium only at more than 100 parts per million addition is achieved. At this level, the activity is much greater than a standard antimony catalyst addition of 200 parts per million, it contains only 32.5% of the metallic addition levels as the antimony catalyst, and it is much less expensive than the equivalent germanium-only catalyst.

Silicon—Samples B5–B9

Silicon shows no significant catalytic activity on its own. However, when combined with germanium, silicon enhanced the catalytic activity of the germanium. Various germanium/silicon levels are shown, each of which shows enhanced activity compared with the same level of germanium on its own. At 40 parts per million germanium addition (B8, B9), an equivalent activity to germanium only of 50 to 60 parts per million addition was achieved.

Manganese—Samples B10–B11

Manganese showed some catalytic activity on its own. However, when combined with germanium, manganese enhanced the catalytic activity of the germanium by a greater amount than would be expected based on the manganese activity on its own. Various germanium/manganese levels have been tested, each of which demonstrated enhanced activity compared with the same level of germanium on its own. At 50 parts per million germanium addition (B 11), an equivalent activity to germanium only of 60 parts per million addition was achieved.

Multi-Component Samples—A29–A30

The tests demonstrate that germanium content can be further reduced by combining the "enhanced" effect of two or more of the additives previously described. Tests A29 and A30 contain the same addition levels of germanium and aluminium as Test A15. However, the addition of a further promoting element, silicon in A29 and lithium in A30, enhanced the activity further from approximately 60 parts per million germanium only equivalent to around 100 parts per million germanium only equivalent.

The information gained from the tests on the above-described reactor have been validated by external tests on both continuous and large-scale batch reactors. These tests have confirmed that, for the range of process and chemical operating parameters used, there is complete correlation with industrial equipment. The inventors are therefore confident that the invention is scientifically valid and is not due to any specific characteristic of the equipment used.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A multi-component catalyst structure for the polycondensation of bis-hydroxy-ethyl terephthalate to produce polyethylene terephthalate comprising the element germanium in an amount of from 1 part per million to 200 parts per million, and one or more catalyst enhancers selected from the group of elements consisting of aluminum in an amount of from 1 part per million to 400 parts per million, silicon in an amount of from 1 part per million to 400 parts per million, molybdenum in an amount of from 1 part per million to 200 parts per million, manganese in an amount of from 1 part per million to 400 parts per million, lithium in an amount of from 1 part per million to 200 parts per million, and combinations thereof, except for a combination of germanium and lithium, wherein said elements are in the form of compounds, salts, compositions, oxides or organic complexes.

2. A catalyst structure as claimed in claim 1 wherein the enhancer is aluminum.

3. A catalyst structure as claimed in claim 2 wherein the level of germanium is 5 to 100 parts per million and the level of aluminum is 20 to 200 parts per million.

4. A catalyst structure as claimed in claim 2 wherein the level of germanium is 20 to 60 parts per million and the level of aluminum is 60 to 150 parts per million.

5. A catalyst structure as claimed in claim 1 wherein the enhancer is silicon.

6. A catalyst structure as claimed in claim 5 wherein the level of germanium is 10 to 80 parts per million and the level of silicon is 10 to 200 parts per million.

7. A catalyst structure as claimed in claim 5 wherein the level of germanium is 20 to 60 parts per million and the level of silicon is 20 to 150 parts per million.

8. A catalyst structure as claimed in claim 1 wherein the enhancer is molybdenum.

9. A catalyst structure as claimed in claim 8 wherein the level of germanium is 1 to 100 parts per million and the level of molybdenum is 1 to 100 parts per million.

10. A catalyst structure as claimed in claim 8 wherein the level of germanium is 20 to 60 parts per million and the level of molybdenum is 1 to 20 parts per million.

11. A catalyst structure as claimed in claim 1 wherein the enhancer is manganese.

12. A catalyst structure as claimed in claim 11 wherein the level of germanium is 10 to 80 parts per million and the level of manganese is 10 to 200 parts per million.

13. A catalyst structure as claimed in claim 11 wherein the level of germanium is 20 to 60 parts per million and the level of manganese is 20 to 150 parts per million.

14. A catalyst structure as claimed in claim 1 wherein the enhancer is lithium and one or more of aluminum, silicon, molybdenum and manganese.

15. A catalyst structure as claimed in claim 1 wherein the enhancer is two or more of aluminum, silicon, molybdenum, manganese and lithium.

16. A catalyst structure as claimed in claim 1 wherein germanium, aluminum, and silicon are selected and the level of germanium in the polyethylene terephthalate is in the range from 1 part per million to 200 parts per million, the level of aluminum in the polyethylene terephthalate is in the range from 1 part per million to 200 parts per million, and the level of silicon in the polyethylene terephthalate is in the range from 1 part per million to 200 parts per million.

17. A catalyst structure as claimed in claim 1 wherein germanium, aluminum, and molybdenum are selected and the level of germanium in the polyethylene terephthalate is in the range from 1 part per million to 200 parts per million, the level of aluminum in the polyethylene terephthalate is in the range from 1 part per million to 200 parts per million, and the level of molybdenum in the polyethylene terephthalate is in the range from 1 part per million to 200 parts per million.

18. A catalyst structure as claimed in claim 1 wherein germanium, aluminum, and manganese are selected and the level of germanium in the polyethylene terephthalate is in the range from 1 part per million to 200 parts per million, the level of aluminum in the polyethylene terephthalate is in the range from 1 part per million to 200 parts per million, and the level of manganese in the polyethylene terephthalate is in the range from 1 part per million to 200 parts per million.

19. A catalyst structure as claimed in claim 1 wherein germanium, aluminum, and lithium are selected and the level of germanium in the polyethylene terephthalate is in the range from 1 part per million to 200 parts per million, the level of aluminum in the polyethylene terephthalate is in the range from 1 part per million to 200 parts per million, and the level of lithium in the polyethylene terephthalate is in the range from 1 part per million to 200 parts per million.

20. A catalyst structure as claimed in claim 1 wherein germanium, silicon, and molybdenum are selected and the level of germanium in the polyethylene terephthalate is in the range from 1 part per million to 200 parts per million, the level of silicon in the polyethylene terephthalate is in the range from 1 part per million to 200 parts per million, and the level of molybdenum in the polyethylene terephthalate is in the range from 1 part per million to 200 parts per million.

21. A catalyst structure as claimed in claim 1 wherein germanium, silicon, and manganese are selected and the level of germanium in the polyethylene terephthalate is in the range from 1 part per million to 200 parts per million, the level of silicon in the polyethylene terephthalate is in the range from 1 part per million to 200 parts per million, and the level of manganese in the polyethylene terephthalate is in the range from 1 part per million to 200 parts per million.

22. A catalyst structure as claimed in claim 1 wherein germanium, silicon, and manganese are selected and the level of germanium in the polyethylene terephthalate is in the range from 1 part per million to 200 parts per million, the level of silicon in the polyethylene terephthalate is in the range from 1 part per million to 200 parts per million, and the level of lithium in the polyethylene terephthalate is in the range from 1 part per million to 200 parts per million.

23. A catalyst structure as claimed in claim 1 wherein germanium, molybdenum, and manganese are selected and the level of germanium in the polyethylene terephthalate is in the range from 1 part per million to 200 parts per million, the level of molybdenum in the polyethylene terephthalate is in the range from 1 part per million to 200 parts per million, and the level of manganese in the polyethylene terephthalate is in the range from 1 part per million to 200 parts per million.

24. A catalyst structure as claimed in claim 1 wherein germanium, manganese, and lithium are selected and the level of germanium in the polyethylene terephthalate is in the range from 1 part per million to 200 parts per million, the level of manganese in the polyethylene terephthalate is in the range from 1 part per million to 200 parts per million, and the level of lithium in the polyethylene terephthalate is in the range from 1 part per million to 200 parts per million.

25. A catalyst structure as claimed in claim 1 wherein germanium, aluminum, silicon, and molybdenum are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, and the level of molybdenum in the polyethylene terephthalate is in the range from 1 part per million to 200 parts per million.

26. A catalyst structure as claimed in claim 1 wherein germanium, aluminum, silicon, and manganese are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, and the level of manganese in the polyethylene terephthalate is in the range from 1 part per million to 200 parts per million.

27. A catalyst structure as claimed in claim 1 wherein germanium, aluminum, silicon, and lithium are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, and the level of lithium in the polyethylene terephthalate is in the range from 1 part per million to 200 parts per million.

28. A catalyst structure as claimed in claim 1 wherein germanium, silicon, molybdenum, and manganese are selected and the level of germanium in the polyethylene terephthalate is in the range from 1 part per million to 200 parts per million, the level of silicon is in the range from 1 part per million to 200 parts per million, the level of molybdenum in the polyethylene terephthalate is in the range from 1 part per million to 200 parts per million, and the level of manganese in the polyethylene terephthalate is in the range from 1 part per million to 200 parts per million.

29. A catalyst system structure as claimed in claim 1 wherein germanium, silicon, molybdenum, and lithium are selected and the level of germanium in the polyethylene terephthalate is in the range from 1 part per million to 200 parts per million, the level of silicon is in the range from 1 part per million to 200 parts per million, the level of molybdenum in the polyethylene terephthalate is in the range from 1 part per million to 200 parts per million, and the level of lithium in the polyethylene terephthalate is in the range from 1 part per million to 200 parts per million.

30. A catalyst system structure as claimed in claim 1 wherein germanium, molybdenum, manganese, and lithium are selected and the level of germanium in the polyethylene terephthalate is in the range from 1 part per million to 200 parts per million, the level of molybdenum is in the range from 1 part per million to 200 parts per million, the level of manganese in the polyethylene terephthalate is in the range from 1 part per million to 200 parts per million, and the level of lithium in the polyethylene terephthalate is in the range from 1 part per million to 200 parts per million.

31. A catalyst structure as claimed in claim 1 wherein germanium, aluminum, molybdenum, and manganese are selected and the level of germanium in the polyethylene terephthalate is in the range from 1 part per million to 200 parts per million, the level of aluminum is in the range from 1 part per million to 200 parts per million, the level of molybdenum in the polyethylene terephthalate is in the range from 1 part per million to 200 parts per million, and the level of manganese in the polyethylene terephthalate is in the range from 1 part per million to 200 parts per million.

32. A catalyst structure as claimed in claim 1 wherein germanium, aluminum, manganese, and lithium are selected and the level of germanium in the polyethylene terephthalate is in the range from 1 part per million to 200 parts per million, the level of aluminum is in the range from 1 part per million to 200 parts per million, the level of manganese in the polyethylene terephthalate is in the range from 1 part per million to 200 parts per million, and the level of lithium in the polyethylene terephthalate is in the range from 1 part per million to 200 parts per million.

33. A catalyst structure as claimed in claim 1 wherein germanium, silicon, molybdenum, and manganese are selected and the level of germanium in the polyethylene terephthalate is in the range from 1 part per million to 200 parts per million, the level of silicon is in the range from 1 part per million to 200 parts per million, the level of molybdenum in the polyethylene terephthalate is in the range from 1 part per million to 200 parts per million, and the level of manganese in the polyethylene terephthalate is in the range from 1 part per million to 200 parts per million.

34. A catalyst structure as claimed in claim 1 wherein germanium, aluminum, molybdenum, and lithium are selected and the level of germanium in the polyethylene terephthalate is in the range from 1 part per million to 200 parts per million, the level of aluminum is in the range from 1 part per million to 200 parts per million, the level of molybdenum in the polyethylene terephthalate is in the range from 1 part per million to 200 parts per million, and the level of lithium in the polyethylene terephthalate is in the range from 1 part per million to 200 parts per million.

35. A catalyst structure as claimed in claim 1 wherein germanium, silicon, manganese, and lithium are selected and the level of germanium in the polyethylene terephthalate is in the range from 1 part per million to 200 parts per million, the level of silicon is in the range from 1 part per million to 200 parts per million, the level of manganese in the polyethylene terephthalate is in the range from 1 part per million to 200 parts per million, and the level of lithium in the polyethylene terephthalate is in the range from 1 part per million to 200 parts per million.

36. A catalyst structure as claimed in claim 1 wherein germanium, aluminum, silicon, manganese, and molybdenum are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, the level of manganese in the polyethylene terephthalate is in the range from 1 part per million to 200 parts per million, and the level of molybdenum in the polyethylene terephthalate is in the range from 1 part per million to 200 parts per million.

37. A catalyst structure as claimed in claim 1 wherein germanium, aluminum, silicon, manganese, and lithium are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, the level of manganese in the polyethylene terephthalate is in the range from 1 part per million to 200 parts per million, and the level of lithium in the polyethylene terephthalate is in the range from 1 part per million to 200 parts per million.

38. A catalyst structure as claimed in claim 1 wherein germanium, silicon, manganese, molybdenum, and lithium are selected and the level of germanium in the polyethylene terephthalate is in the range from 1 part per million to 200 parts per million, the level of silicon is in the range from 1 part per million to 200 parts per million, the level of manganese in the polyethylene terephthalate is in the range from 1 part per million to 200 parts per million, the level of molybdenum in the polyethylene terephthalate is in the range from 1 part per million to 200 parts per million, and the level of lithium in the polyethylene terephthalate is in the range from 1 part per million to 200 parts per million.

39. A catalyst structure as claimed in claim 1 wherein germanium, aluminum, silicon, molybdenum, and lithium are selected and the level of germanium in the polyethylene terephthalate is in the range from 1 part per million to 200 parts per million, the level of aluminum is in the range from 1 part per million to 200 parts per million, the level of silicon in the polyethylene terephthalate is in the range from 1 part per million to 200 parts per million, the level of molybdenum in the polyethylene terephthalate is in the range from 1 part per million to 200 parts per million, and the level of lithium in the polyethylene terephthalate is in the range from 1 part per million to 200 parts per million.

* * * * *

UNITED STATES PATENT AND TRADEMARK OFFICE
CERTIFICATE OF CORRECTION

PATENT NO. : 6,953,768 B2
DATED : October 11, 2005
INVENTOR(S) : Andrew Wallace, Philip James Martin and Alan David Farnaby It is certified that error appears in the above-identified patent and that said Letters Patent is hereby corrected as shown below:

Column 10,
Line 65, "manganese" should be -- lithium --.

Signed and Sealed this

Seventh Day of February, 2006

JON W. DUDAS
*Director of the United States Patent and Trademark Office*